(12) United States Patent
Hossain et al.

(10) Patent No.: US 11,982,816 B1
(45) Date of Patent: May 14, 2024

(54) WEARABLE DEVICES WITH ADJUSTABLE FIT

(71) Applicant: Apple Inc., Cupertino, CA (US)

(72) Inventors: Muhammad F. Hossain, Sunnyvale, CA (US); Samuel A. Resnick, San Francisco, CA (US); Prashanth Reddy Duvvuru Kamakshi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/684,295

(22) Filed: Mar. 1, 2022

Related U.S. Application Data

(60) Provisional application No. 63/164,920, filed on Mar. 23, 2021.

(51) Int. Cl.
*G02B 27/01* (2006.01)

(52) U.S. Cl.
CPC ..... *G02B 27/0176* (2013.01); *G02B 27/0179* (2013.01); *G02B 2027/0159* (2013.01)

(58) Field of Classification Search
CPC ............ G02B 27/0176; G02B 27/0179; G02B 2027/0154; G02B 2027/0158; G02B 2027/0159; G02B 27/017; G02B 27/0172; G02B 27/0093
See application file for complete search history.

(56) References Cited

U.S. PATENT DOCUMENTS

| | | | |
|---|---|---|---|
| 11,009,712 B2 * | 5/2021 | Chang | G06F 1/163 |
| 11,029,729 B1 | 6/2021 | Bristol | |
| 2016/0100237 A1 | 4/2016 | Blouse | |
| 2016/0216512 A1 | 7/2016 | Miller et al. | |
| 2016/0299346 A1 | 10/2016 | Allin et al. | |
| 2018/0046147 A1 * | 2/2018 | Aghara | G06F 3/012 |
| 2019/0072772 A1 * | 3/2019 | Poore | G06F 3/013 |
| 2019/0079301 A1 * | 3/2019 | Sauers | G02B 27/0176 |
| 2019/0258442 A1 * | 8/2019 | Hudman | G02B 27/0176 |
| 2021/0173206 A1 * | 6/2021 | Das | G02B 27/0172 |
| 2021/0271091 A1 * | 9/2021 | Xu | G02B 27/0176 |
| 2022/0317445 A1 * | 10/2022 | Nicholson | G02B 27/0172 |

* cited by examiner

*Primary Examiner* — Xuemei Zheng
(74) *Attorney, Agent, or Firm* — BAKERHOSTETLER

(57) ABSTRACT

A head-mountable device can include an ability to adjust a fit as needed for a particular user or activity. For example, a light seal module that provides engagement of a user's face and transmits light from a display element can be coupled to an HMD module. The light seal module can be provided in a wide variety of adjustable sizes and/or shapes to allow any given user to select an appropriate one for optimal alignment of an HMD module. The head-mountable device and/or other electronic devices can be operated to guide a user to select the optimal light seal module arrangement for use with an HMD module. For example, the head-mountable device or another device can include sensors for detecting an identity of a user, features of the user's face, forces distributed on the face when worn, and/or an activity being performed.

20 Claims, 9 Drawing Sheets

WEARABLE DEVICES WITH ADJUSTABLE FIT

CROSS-REFERENCE TO RELATED APPLICATION

This application claims the benefit of U.S. Provisional Application No. 63/164,920, entitled "WEARABLE DEVICES WITH ADJUSTABLE FIT," filed Mar. 23, 2021, the entirety of which is incorporated herein by reference.

TECHNICAL FIELD

The present description relates generally to head-mountable devices, and, more particularly, to head-mountable devices with adjustable fit capabilities.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
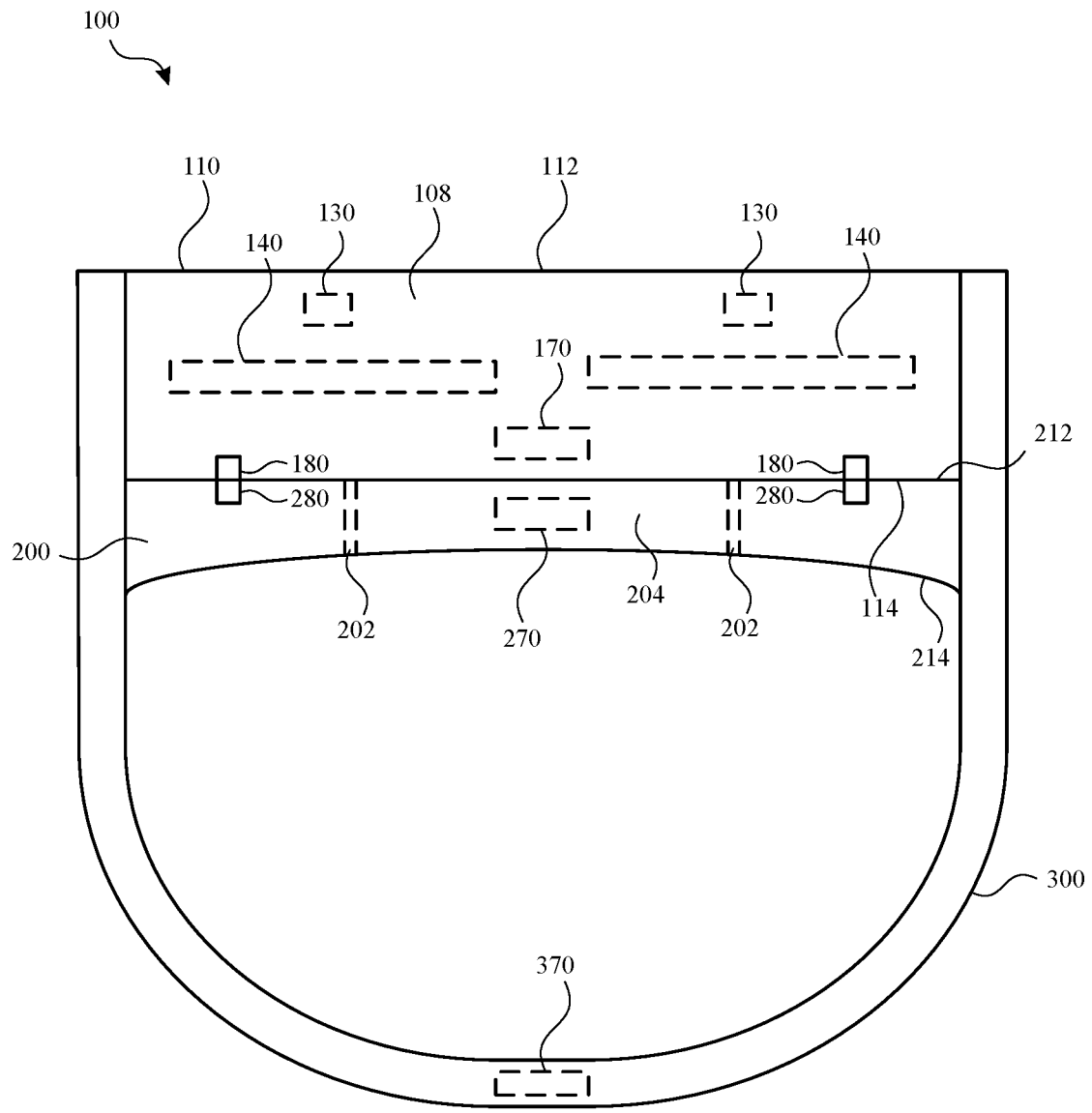
FIG. 1 illustrates a top view of a head-mountable device, according to some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mountable displays, headsets, visors, smartglasses, head-up display, etc., can perform a range of functions that are managed by the components (e.g., sensors, circuitry, and other hardware) included with the wearable device.

Many of the functions performed by a head-mountable device are optimally experienced when the components are in their most preferred position and orientation with respect to a user wearing the head-mountable device. For example, the head-mountable device can include a display element that visually outputs display-based information toward the eyes of the user. The position and orientation of the display elements relative to the eyes depends, at least in part, on how the head-mountable device is positioned on the face of the user. Due to variations in facial features across different users, a given head-mountable device may require adjustment to accommodate different users. For example, different users can have different facial features (e.g., face plane slope, forehead size, eye location). Accordingly, different users may perceive the displayed information differently unless a preferred arrangement is provided. Additionally, a different position and/or orientation and/or tightness of fit may be preferred for particular activities.

It can be costly to require each user to acquire an entire head-mountable device that is specifically tailored to their facial features. In particular, such an approach would require customization of each head-mountable device and/or the ability to choose from a wide variety of head-mountable devices.

Systems of the present disclosure can provide a head-mountable device with an ability to adjust a fit as needed for a particular user or activity. For example, a light seal module that provides engagement of a user's face and transmits light from a display element can be coupled to an HMD module. The light seal module can be provided in a wide variety of adjustable sizes and/or shapes to allow any given user to select an appropriate one for optimal alignment of an HMD module. The head-mountable device and/or other electronic devices can be operated to guide a user to select the optimal light seal module arrangement for use with an HMD module. For example, the head-mountable device or another device can include sensors for detecting an identity of a user, features of the user's face, forces distributed on the face when worn, and/or an activity being performed.

These and other embodiments are discussed below with reference to FIGS. 1-16. However, those skilled in the art will readily appreciate that the detailed description given herein with respect to these Figures is for explanatory purposes only and should not be construed as limiting.

According to some embodiments, for example as shown in FIG. 1, a head-mountable device 100 includes an HMD module 110 and a light seal module 200. The HMD module 110 includes a frame 108 that is worn on a head of a user. The frame 108 can be positioned in front of the eyes of a user to provide information within a field of view of the user. The HMD module 110 and/or the light seal module 200 can provide nose pads and/or other portions to rest on a user's nose, forehead, cheeks, and/or other facial features as described further herein.

The frame 108 can be supported on a user's head with the securement element 300. The head securement element 300 can wrap around or extend along opposing sides of a user's head. The securement element 300 can optionally include earpieces for wrapping around or otherwise engaging or resting on a user's ears. It will be appreciated that other configurations can be applied for securing the head-mountable device 100 to a user's head. For example, one or more bands, straps, belts, caps, hats, or other components can be used in addition to or in place of the illustrated components of the head-mountable device 100. By further example, the head securement element 300 can include multiple components to engage a user's head. The head securement element 300 can extend from the HMD module 110 and/or the light seal module 200.

The frame 108 can provide structure around a peripheral region thereof to support any internal components of the frame 108 in their assembled position. For example, the frame 108 can enclose and support various internal components (including for example integrated circuit chips, processors, memory devices and other circuitry) to provide computing and functional operations for the head-mountable device 100, as discussed further herein. While several components are shown within the frame 108, it will be understood that some or all of these components can be located anywhere within or on the head-mountable device 100. For example, one or more of these components can be positioned within the head securement element 300, the light seal module 200, and/or the HMD module 110 of the head-mountable device 100.

The frame 108 can include and/or support one or more cameras 130. The cameras 130 can be positioned on or near an outer side 112 of the frame 108 to capture images of views external to the head-mountable device 100. As used herein, an outer side of a portion of a head-mountable device is a side that faces away from the user and/or towards an external environment. The captured images can be used for display to the user or stored for any other purpose. Each of the cameras 130 can be movable along the outer side 112. For example, a track or other guide can be provided for facilitating movement of the camera 130 therein.

The head-mountable device 100 can include display elements 140 that provide visual output for viewing by a user wearing the head-mountable device 100. One or more display elements 140 can be positioned on or near an inner side 114 of the frame 108. As used herein, an inner side 114 of a portion of a head-mountable device is a side that faces toward the user and/or away from the external environment.

A display element 140 can transmit light from a physical environment (e.g., as captured by a camera) for viewing by the user. Such a display element 140 can include optical properties, such as lenses for vision correction based on incoming light from the physical environment. Additionally or alternatively, a display element 140 can provide information as a display within a field of view of the user. Such information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Each display element 140 can be adjusted to align with a corresponding eye of the user. For example, each display element 140 can be moved along one or more axes until a center of each display element 140 is aligned with a center of the corresponding eye. Accordingly, the distance between the display elements 140 can be set based on an interpupillary distance of the user. IPD is defined as the distance between the centers of the pupils of a user's eyes.

The pair of display elements 140 can be mounted to the frame 108 and separated by a distance. The distance between the pair of display elements 140 can be designed to correspond to the IPD of a user. The distance can be adjustable to account for different IPDs of different users that may wear the head-mountable device 100. For example, either or both of the display elements 140 may be movably mounted to the frame 108 to permit the display elements 140 to move or translate laterally to make the distance larger or smaller. Any type of manual or automatic mechanism may be used to permit the distance between the display elements 140 to be an adjustable distance. For example, the display elements 140 can be mounted to the frame 108 via slidable tracks or guides that permit manual or electronically actuated movement of one or more of the display elements 140 to adjust the distance there between.

Additionally or alternatively, the display elements 140 can be moved to a target location based on a desired visual effect that corresponds to user's perception of the display element 140 when it is positioned at the target location. The target location can be determined based on a focal length of the user and/or optical elements of the system. For example, the user's eye and/or optical elements of the system can determine how the visual output of the display element 140 will be perceived by the user. The distance between the display element 140 and the user's eye and/or the distance between the display element 140 and one or more optical elements can be altered to place the display element 140 at, within, or outside of a corresponding focal distance. Such adjustments can be useful to accommodate a particular user's eye, corrective lenses, and/or a desired optical effect.

As further shown in FIG. 1, the light seal module 200 can include a chassis 202 that provides structural support to one or more other components of the light seal module 200. The chassis 202, or portions thereof, can extend to, from, and/or between the inner side 214 and the outer side 212. The chassis 202 can support a cover 204 that extends at least partially from the outer side 212 to the inner side 214. The chassis 202 and/or the cover 204 can define an interior space through which light can pass, thereby providing to the user wearing the head-mountable device a view of a display elements 140 of the HMD module 110. Such a view can be enhanced by preventing the ingress of light from the external environment and into the light seal module 200.

The components of the head-mountable device 100 can be provided with modular configurations that facilitate engagement (e.g., assembly) and release. As used herein, "modular" or "module" can refer to a characteristic that allows an item, such as a light seal module, to be connected, installed, removed, swapped, and/or exchanged by a user in conjunction with another item, such as an HMD module of a head-mountable device. Connection of a light seal module, a head securement element, and/or an HMD module can be performed and reversed, followed by disconnection and connection of another module replacing the prior module. As such, multiple modules can be exchangeable with each other with respect to another module.

Attachment elements can facilitate coupling of the HMD module 110 to the light seal module 200 in a relative position and orientation that aligns the display elements 140 of the HMD module 110 in a preferred position and orientation for viewing by the user. The HMD module 110 and the light seal module 200 can be coupled to prevent ingress of light from an external environment. For example, HMD module attachment elements 180 can releasably engage light seal module attachment elements 280. One or more of various mechanisms can be provided to secure the modules to each other. For example, mechanisms such as locks, latches, snaps, screws, clasps, threads, magnets, pins, an interference (e.g., friction) fit, knurl presses, bayoneting, and/or combinations thereof can be included to couple and/or secure the HMD module 110 and the light seal module 200 together. The modules can remain secured to each other until an optional release mechanism is actuated. The release mechanism can be provided on an outer surface of the head-mountable device 100 for access by a user.

While the light seal module 200 is shown schematically with a particular size and shape, it will be understood that the size and shape of the light seal module 200, particularly at the inner side 214 of the light seal module 200, can have a size and shape that accommodates the face of a user wearing the head-mountable device 100. For example, the inner side 214 can provide a shape that generally matches the contours of the user's face around the eyes of the user, as described further herein. The inner side 214 can be provided with one or more features that allow the light seal module 200 to conform to the face of the user to enhance comfort and block light from entering the light seal module 200 at the points of contact with the face. For example, the inner side 214 can provide a flexible, soft, elastic, and/or compliant structure.

While the head-mountable device 100 is worn by a user, with the inner side 214 of the light seal module 200 against the face of the user and/or with the head securement element 300 against the head of the user, at least the inner side 214 of the light seal module 200 can remain in a fixed location and orientation with respect to the face and head of the user. The light seal module 200 and/or the HMD module 110 can be adjusted to provide the HMD module 110 in a desired location and orientation with respect to the face and head of the user. Given the variety of head and face shapes that different users may have, it can be desirable to provide a head-mountable device 100 with customization and adjustability so that the HMD module 110 is in a desired position and orientation with respect to the face and head of the user during use.

The head-mountable device 100 can include one or more user sensors for tracking features of the user wearing the head-mountable device 100. Such a sensor can be located at, included with, and/or associated with the HMD module 110, the light seal module 200, and/or the head securement element 300. For example, a user sensor can include or accompany a user sensor 170 of the HMD module 110, a force sensor 270 of the light seal module 200, and/or a head securement sensor 370 of the head securement element 300.

As shown in FIG. 1, a head-mountable device 100 or another electronic device can provide a user sensor 170 that is operable to measure and/or identify features of the face of the user. The user sensor 170 can be operated to identify the user wearing the head-mountable device 100. According to some embodiments, a head-mountable device 100 can operate the user sensor 170 to detect and/or measure one or more regions of a face of a user. Such detections and measurements can be used to determine appropriate adjustments to and/or with respect to a light seal module to achieve a desired fit with respect to the face of the user.

For example, user identification can be provided based on detected features of the user. Such features can include eye features (e.g., iris color, shape, etc.), facial contours, and the like. The user sensor 170 can include one or more types of sensors. For example the user sensor 170 can include one or more image sensors, depth sensors, thermal (e.g., infrared) sensors, and the like. By further example, a depth sensor can be configured to measure a distance (e.g., range) to an object (e.g., region of the user's face) via stereo triangulation, structured light, time-of-flight, interferometry, and the like. Additionally or alternatively, the user sensor 170 and/or the device can capture and/or process an image based on one or more of hue space, brightness, color space, luminosity, and the like.

By further example, the user sensor 170 can include a touch sensor configured to identify the user based on other types of input, such as a fingerprint scan upon touch input. By further example, the user sensor 170 can be an input device that receives input from the user to identify the user based on a unique identifier (e.g., selection from menu of users, passcode, password, etc.).

While the user sensor 170 is depicted as a component of the head-mountable device 100, additionally or alternatively, a user sensor can be a component of another type of electronic device ("external device"), such as a portable computing device, a tablet device, a laptop computer, a smartphone, a smart watch, or other appropriate devices that include one or more sensors and/or input devices. The external device can identify the user and communicate such an identification to the head-mountable device 100. The external device can be associated with a particular user, such that when the external device is brought into proximity of the head-mountable device 100, the head-mountable device 100 interprets the presence of the external device as an indication that the associated user is wearing the head-mountable device 100. The head-mountable device 100 can make adjustments, as described further herein, based on the identification.

As shown in FIG. 1, a head-mountable device 100 or another electronic device can include sensors that are operated to detect and/or measure one or more forces on the face of a user. Such detections and measurements can be used to determine which of a variety of adjustable configurations is most appropriate to achieve a desired fit with respect to the face of the user.

For example, a light seal module 200 can provide force sensors 270 that are operable to measure magnitudes of forces applied to one or more regions of the face of a user. Such regions can include the regions that are engaged by the light seal module 200 as the head-mountable device 100 is worn by the user. For example, the regions can include a forehead, a nose, and/or one or both cheeks. The force sensor 270 can include one or more types of sensors. The force sensor 270 can include a component that converts mechanical motion and/or deformation of the light seal module 200 into an electric signal. The force sensor 270 can include one or more contact sensors, capacitive sensors, strain gauges, resistive touch sensors, piezoelectric sensors, cameras, pressure sensors, photodiodes, and/or other sensors. The force sensor 270 can detect both the presence and magnitude of a force.

By further example, a user sensor can perform facial feature detection, facial movement detection, facial recognition, eye tracking, user mood detection, user emotion detection, voice detection, etc. Such eye tracking may be used to determine a location of information to be displayed on the display elements 140 and/or a portion (e.g., object) of a view to be analyzed by the head-mountable device 100. By further example, the user sensor can be a bio-sensor for tracking biometric characteristics, such as health and activity metrics. The user sensor can include a bio-sensor that is configured to measure biometrics such as electrocardiographic (ECG) characteristics, galvanic skin resistance, and other electrical properties of the user's body. Additionally or alternatively, a bio-sensor can be configured to measure body temperature, exposure to UV radiation, and other health-related information.

By further example, the head securement element 300 and/or another component of the head-mountable device 100 can include a head securement sensor 370 for detecting tension in or another condition of the head securement element 300. Operation of such sensors can facilitate determination of which of a variety of light seal modules is recommended for user by a particular user.

One or more sensors can be provided to detect a fit of the light seal module 200 with respect to a face of a user. For example, the HMD module 110 and/or another component of the head-mountable device 100 can include a light sensor for detecting light within the light seal module 200, as described further herein. By further example, the light seal module 200 and/or another component of the head-mountable device 100 can include a force sensor 270 for detecting forces applied to regions of the face of the user, as described further herein. By further example, the head securement element 300 and/or another component of the head-mountable device 100 can include a head securement sensor 370 for detecting tension in or another condition of the head securement element 300. Operation of such sensors can facilitate determination of which of a variety of adjustable configurations is most appropriate to achieve a desired fit with respect to the face of the user.

Figure 2:
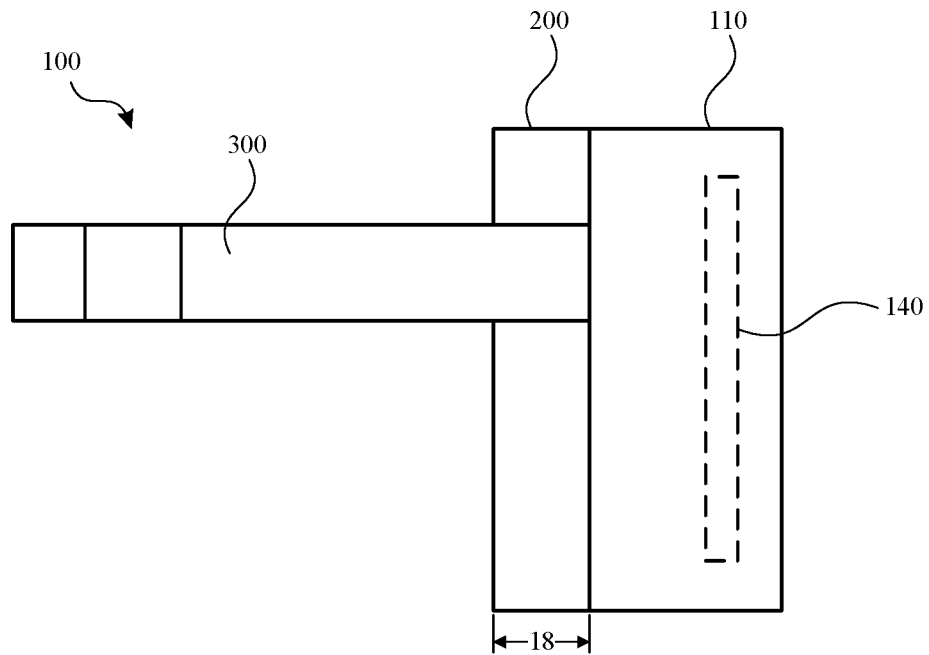
FIG. 2 illustrates a side view of a head-mountable device in a first configuration, according to some embodiments of the present disclosure.
Figure 3:
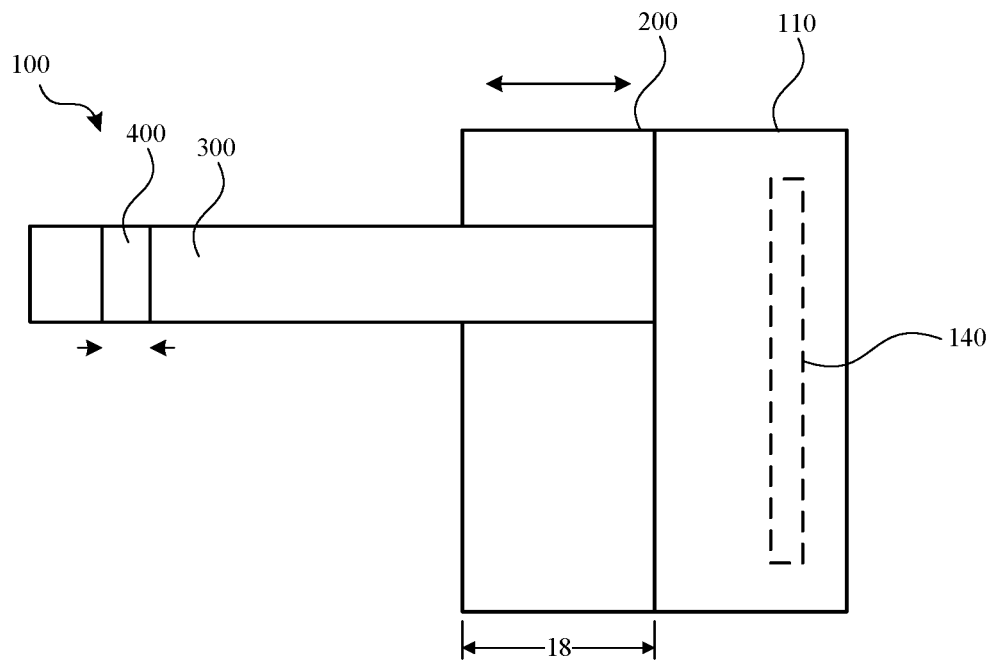
FIG. 3 illustrates a side view of the head-mountable device of FIG. 2 in a second configuration, according to some embodiments of the present disclosure.

Referring now to FIGS. 2 and 3, the light seal module can have an adjustable thickness that allows the HMD module to be positioned at a desired distance from the head, face, and/or eyes of the user. For example, as shown in FIG. 2, the light seal module 200 can have a thickness 18 in a first configuration, in which an inner side of the light seal module and an inner side of the HMD module are separated by a first distance. Such a configuration can place the display element 140 at a desired distance away from the eyes of the user. Such a distance can provide proper viewing of the display element 140.

By further example, as shown in FIG. 3, the light seal module 200 can adjust its thickness 18 in to achieve a second configuration, in which an inner side of the light seal module and an inner side of the HMD module are separated by a second distance, greater than the first distance. Such a configuration can place the display element 140 at a greater distance away from the eyes of the user. Such a greater distance can provide adequate clearance, for example for additional components such as glasses, lenses, or other optical equipment.

The thickness of the light seal module 200 can be adjusted by one or more of a variety of mechanisms. For example, the light seal module 200 can include one or more sliding members, linear actuators, pistons, rack and pinion systems, hydraulic systems, electroactive polymers, piezoelectric elements, and the like. Such mechanisms can be controllably operated by a motor, controller, processor, or other component onboard the head-mountable device 100. Multiple adjustment mechanisms can be actuated simultaneously to perform the desired adjustment.

The thickness 18 of one or more portions of the light seal module 200 can be selected based on the desired target distances as needed to place an HMD module at a desired position relative to the head, face, and/or eyes of the user. Where such a desired position are known, the light seal module can be adjusted to provide the appropriate thickness 18 to place the HMD module at the desired position when the light seal module is engaged to the HMD module and the face of the user.

While FIGS. 2 and 3 illustrate an adjustable thickness, it will be understood that any dimension can be considered for adjusting a light seal module. For example, a width and/or height of any portion and/or between different portions can be adjusted. Additionally, such adjustments can affect the tightness of the head securement element 300 and fit of the light seal module 200 on the face of the user.

It will be understood that an adjustment to the HMD module 110 with respect to the light seal module 200 can result in an adjustment to the HMD module 110 with respect to the face and/or head of the user. As such, the adjustments described herein can alter a tightness of the head securement element 300 on the head of the user. For example, by moving the HMD module 110 away from the face of the user (e.g., by increasing the thickness of the light seal module 200), tension along the head securement element 300 can be increased. By further example, by moving the HMD module 110 toward the face of the user (e.g., by decreasing the thickness of the light seal module 200), tension along the head securement element 300 can be decreased.

Additionally or alternatively, the tension in the head securement element can be adjusted with a tensioner. As shown in FIGS. 2 and 3, a head-mountable device 100 can include one or more tensioners 400 at one or more locations along a length of the head securement element 300. The tensioner 400 can adjust a relative position of segments of the head securement element 300, such as a segment attached to a side of the HMD module 110 and a segment on a rear side of the head-mountable device. It will be understood that the tensioners can be positioned at, within, or adjacent to any portion of the head securement element 300.

As shown in FIG. 2, the tensioner 400 can have an extended position, in which adjacent segments of the head securement element 300 are a first distance apart. As shown in FIG. 3, the tensioner 400 can have a retracted position, in which adjacent segments of the head securement element 300 are a second distance, greater than the first distance, apart. The tensioner 400 can be operated to allow the head securement element 300 to retract and reduce or eliminate the gap between the segments. During such extension and/or retraction, tensioner 400 and/or segments of the head securement element 300 can move relative to and/or within one another.

The tensioner 400 can include one or more of a variety of components. For example, the tensioner 400 can include or be connected to motors, hydraulic actuators, pneumatic actuators, magnetic actuators, piezoelectric actuators, electroactive materials, stepper motors, shape-memory alloys, and the like, as well as drivetrain components such as gears, clutches, and/or transmissions, to facilitate independent or simultaneous movement of components based on operation of corresponding tensioners. In some embodiments, a tensioner can be an analog, digital, or integrated circuit configured to apply an electrical signal to cause tension (either directly or indirectly) to be applied to, or relieved form, the components. In some embodiments, a tensioner can be a physical apparatus such as a motor, electromagnetic coil, or solenoid that can be actuated to cause tension (either directly or indirectly) to be applied to, or relieved from, the components. Accordingly, the term "tensioner" and related phrases and terminology is used herein to generally refer to a circuit, apparatus, controller, or program code executed by a processor, that is configured to cause, either directly or indirectly, tension in a connector to increase or decrease.

While the tensioner 400 is shown in FIGS. 2 and 3 to complement the tensioning effects of the adjustments to the light seal module 200 and/or the HMD module 110, it will be understood that the tensioner 400 can be operated to offset and/or negate the tensioning effects of the effects of the adjustments to the light seal module 200 and/or the HMD module 110. For example, the tensioner 400 can relieve tension when the HMD module 110 moves away from the face of the user (e.g., by increasing the thickness of the light seal module 200). By further example, the tensioner 400 can increase tension when the HMD module 110 moves toward the face of the user (e.g., by decreasing the thickness of the light seal module 200). Accordingly, the tension in the head securement element 300 and the tightness of the fit of the head-mountable device 100 can be adjusted as an effect of the adjustments to the light seal module 200 and/or the HMD module 110, but the tension in the head securement element 300 and the tightness of the fit of the head-mountable device 100 can also be adjusted to reduce or avoid the effect of the adjustments to the light seal module 200 and/or the HMD module 110.

It will be understood that such adjustments to thickness, distance, tensions, and/or tightness can be adjusted based on one or more of a variety of factors, as discussed further herein.

Referring now to FIGS. 4-7, a position of the HMD module can be adjusted relative to a light seal module based on one or more automated or manually controlled mechanisms. While the light seal module itself can change its thickness, it will be understood that the position of the HMD module can optionally be adjusted by altering its position relative to the light seal module, regardless of whether the light seal module changes its thickness.

Figure 4:
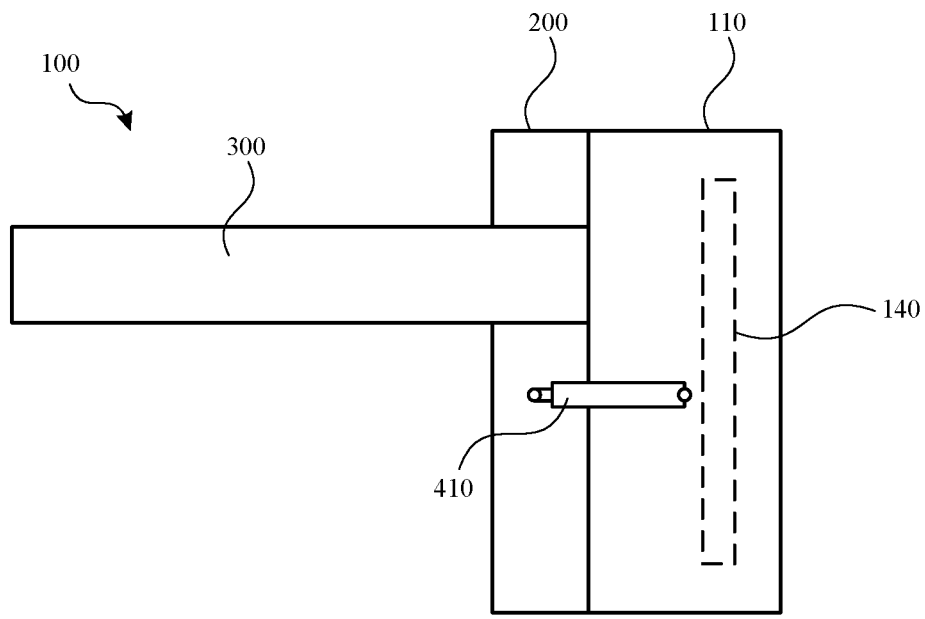
FIG. 4 illustrates a side view of a head-mountable device in a first configuration, according to some embodiments of the present disclosure.

As shown in FIG. 4, the HMD module 110 can be in a first position with respect to the light seal module 200, in which an inner side of the light seal module 200 and an inner side of the HMD module 110 are separated by a first distance. Such a configuration can place the display element 140 at a desired distance away from the eyes of the user. Such a distance can provide proper viewing of the display element 140.

Figure 5:
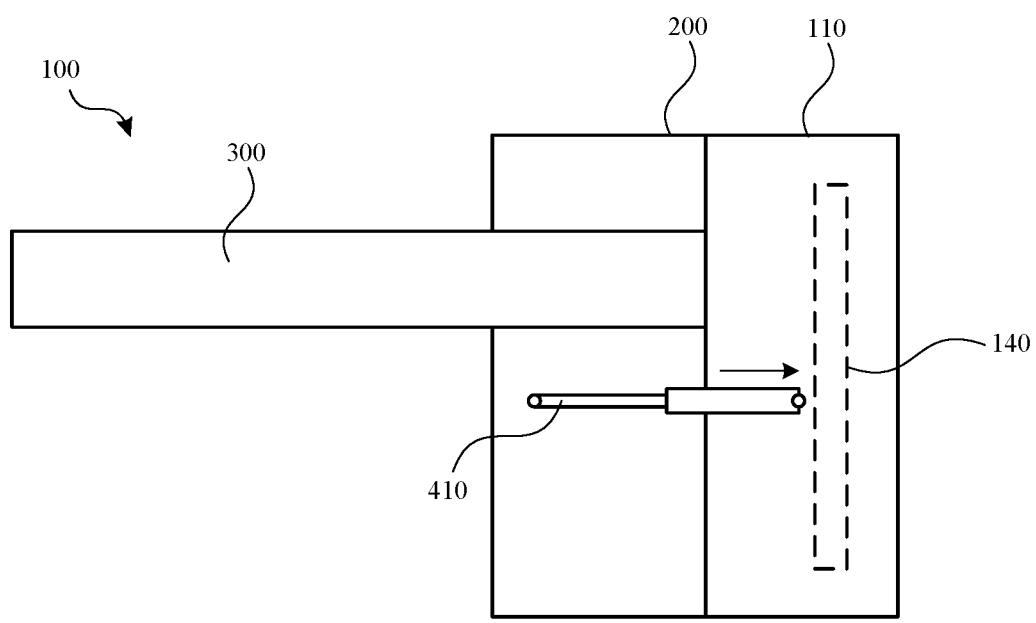
FIG. 5 illustrates a side view of the head-mountable device of FIG. 4 in a second configuration, according to some embodiments of the present disclosure.

As shown in FIG. 5, an actuation element 410 can be operated to move the HMD module 110 to a second position with respect to the light seal module 200, in which an inner side of the light seal module 200 and an inner side of the HMD module 110 are separated by a second distance, greater than the first distance. Such a configuration can place the display element 140 at a greater distance away from the eyes of the user. Such a greater distance can provide adequate clearance, for example for additional components such as glasses, lenses, or other optical equipment.

The actuation element 410 can be actively operated based on control signals generated by a component of the head-mountable device 100 and/or in response to detected conditions. The actuation element 410 can include one or more sliding members, linear actuators, pistons, rack and pinion systems, hydraulic systems, electroactive polymers, piezoelectric elements, and the like. Such mechanisms can be controllably operated by a motor, controller, processor, or other component onboard the head-mountable device 100. Multiple adjustment mechanisms can be actuated simultaneously to perform the desired adjustment.

Figure 6:
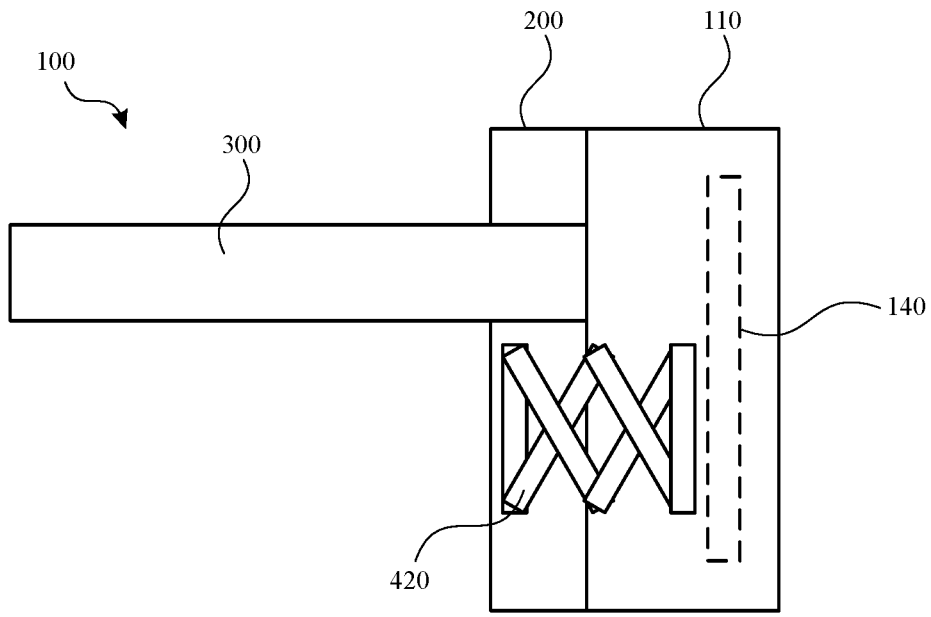
FIG. 6 illustrates a side view of a head-mountable device in a first configuration, according to some embodiments of the present disclosure.

While the adjustment described herein can be automated, additionally or alternatively a user can manually adjust a distance. As shown in FIG. 6, the HMD module 110 can be manually placed in a first position with respect to the light seal module 200, in which an inner side of the light seal module 200 and an inner side of the HMD module 110 are separated by a first distance.

Figure 7:
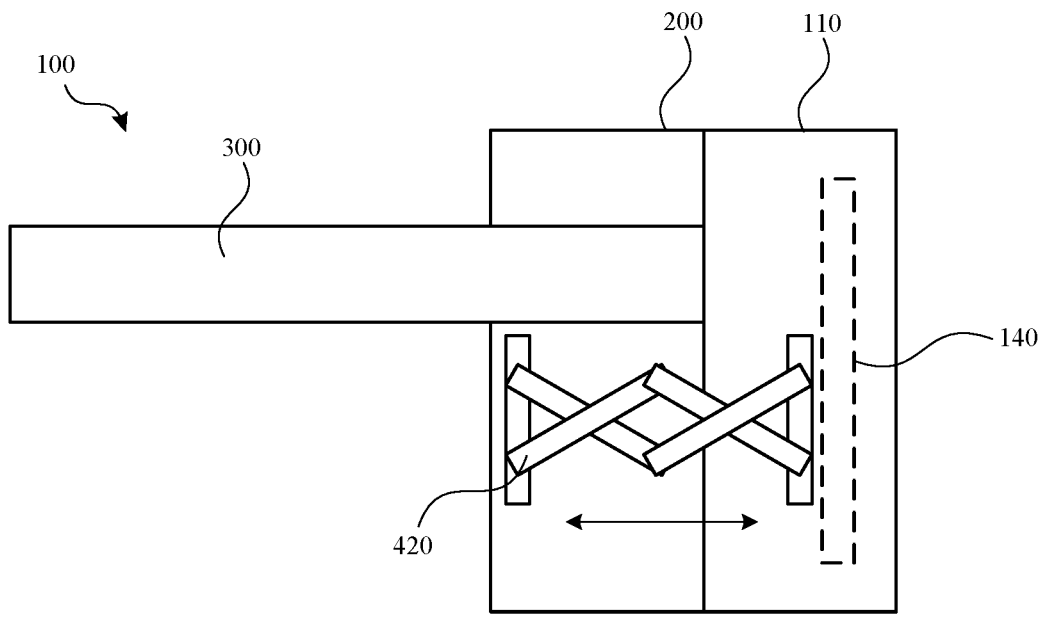
FIG. 7 illustrates a side view of the head-mountable device of FIG. 6 in a second configuration, according to some embodiments of the present disclosure.

As shown in FIG. 7, an adjustment element 420 can facilitate manual adjustment to move the HMD module 110 to a second position with respect to the light seal module 200, in which an inner side of the light seal module 200 and an inner side of the HMD module 110 are separated by a second distance, greater than the first distance. The adjustment element 420 can be manually operated when grasped or otherwise acted upon by a user. The adjustment element 420 can include one or more expandable elements, hinged devices, sliding members, pistons, rollers, tracks, and the like. Such mechanisms can be controllably operated by a user, and termination of such operation can allow the HMD module 110 to remain in place. For example, a brake, detent, friction member, and the like can maintain the HMD module 110 in a position achieved by the user.

Figure 8:
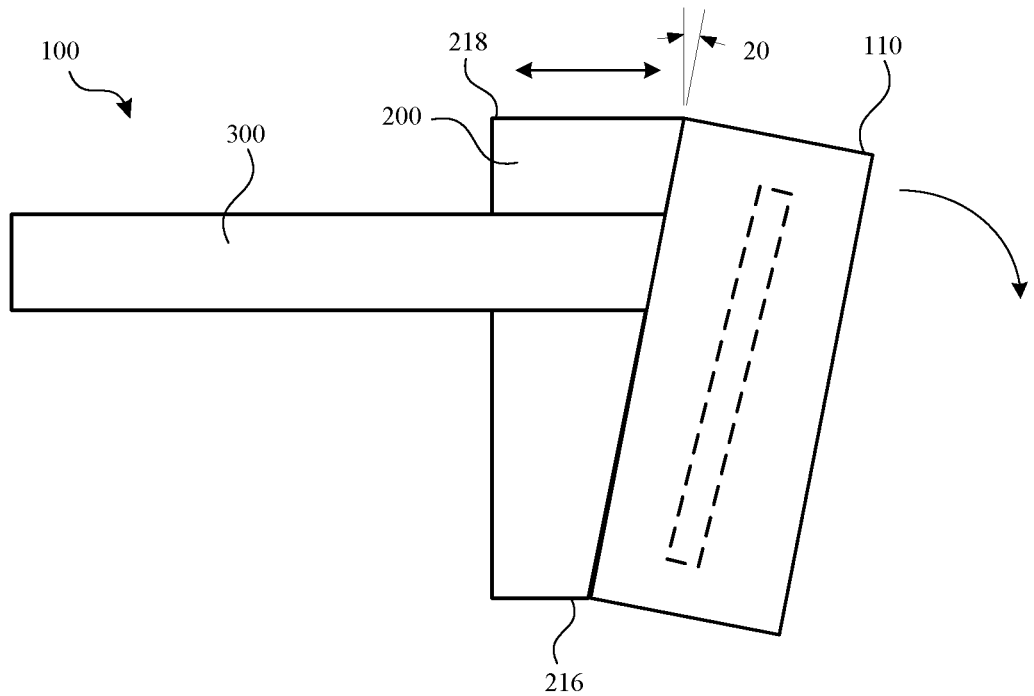
FIG. 8 illustrates a side view of a head-mountable device in a first configuration, according to some embodiments of the present disclosure.
Figure 9:
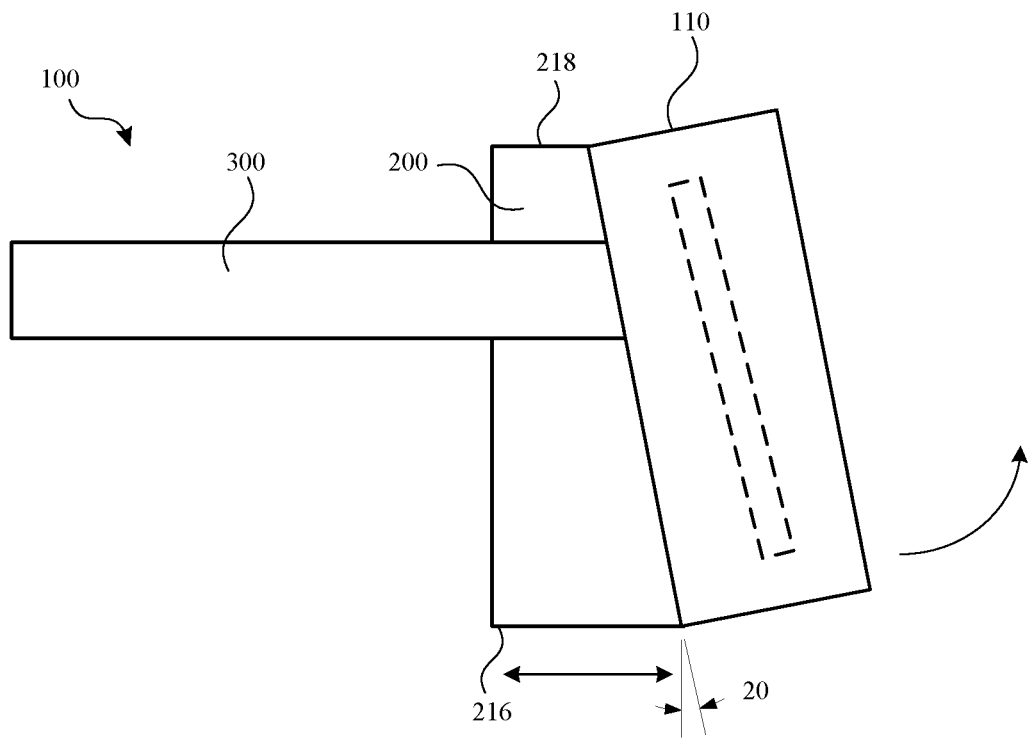
FIG. 9 illustrates a side view of the head-mountable device of FIG. 8 in a second configuration, according to some embodiments of the present disclosure.

Referring now to FIGS. 8 and 9, the light seal module can have an adjustable and variable thickness that allows the HMD module to be oriented at a desired orientation with respect to the head, face, and/or eyes of the user. For example, as shown in FIG. 8, the light seal module 200 can form an angle 20 in a first configuration, in which the HMD module 110 is tilted to achieve a first orientation. Such a configuration can place the display element 140 at a desired orientation with respect to the eyes of the user. Such an orientation can provide proper viewing of the display element 140. By further example, as shown in FIG. 9, the light seal module 200 can adjust the angle 20 to achieve a second configuration, in which the HMD module 110 is tilted to achieve a second orientation, different than the first orientation.

The angle 20 can be selected based on the desired target tilt as needed to place an HMD module at a desired orientation relative to the head, face, and/or eyes of the user. Where such a desired orientation are known, the light seal module can be adjusted to provide the appropriate angle 20 to place the HMD module at the desired orientation when the light seal module is engaged to the HMD module and the face of the user.

It will be understood that the adjustment of the angle can be achieved by altering the effective thickness of an upper side 218 and/or a lower side 216 of the light seal module 200. For example, the upper side 218 can increase in thickness and/or the lower side 216 can decrease in thickness as shown in FIG. 8. By further example, the upper side 218 can decrease in thickness and/or the lower side 216 can increase in thickness as shown in FIG. 9.

The thicknesses of one or more sides the light seal module 200 can be adjusted by one or more of a variety of mechanisms. For example, the light seal module 200 can include, on or more sides, one or more sliding members, linear actuators, pistons, rack and pinion systems, hydraulic systems, electroactive polymers, piezoelectric elements, and the like. Such mechanisms can be controllably operated by a motor, controller, processor, or other component onboard the head-mountable device 100. Multiple adjustment mechanisms can be actuated in different ways to perform the desired adjustment to tilt.

It will be understood that such adjustments to angle and/or orientation can be adjusted based on one or more of a variety of factors, as discussed further herein. Such adjustments can effect the distribution of forces applied by the light seal module 200 on the face of the user.

Referring now to FIGS. 10-13, a tilt of the HMD module can be adjusted relative to a light seal module based on one or more automated or manually controlled mechanisms. While the light seal module itself can change its thickness, it will be understood that the angle of the HMD module can optionally be adjusted by altering its orientation relative to the light seal module, regardless of whether the light seal module changes its shape.

Figure 10:
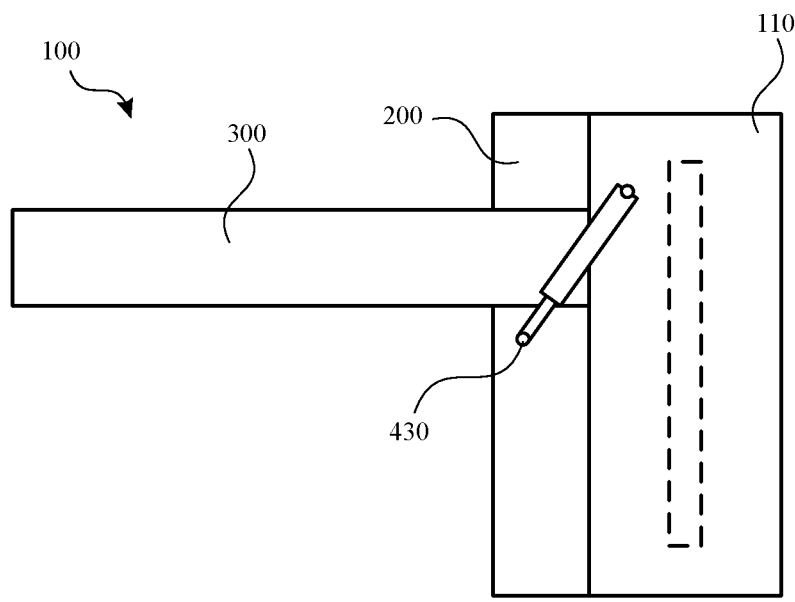
FIG. 10 illustrates a side view of a head-mountable device in a first configuration, according to some embodiments of the present disclosure.
Figure 11:
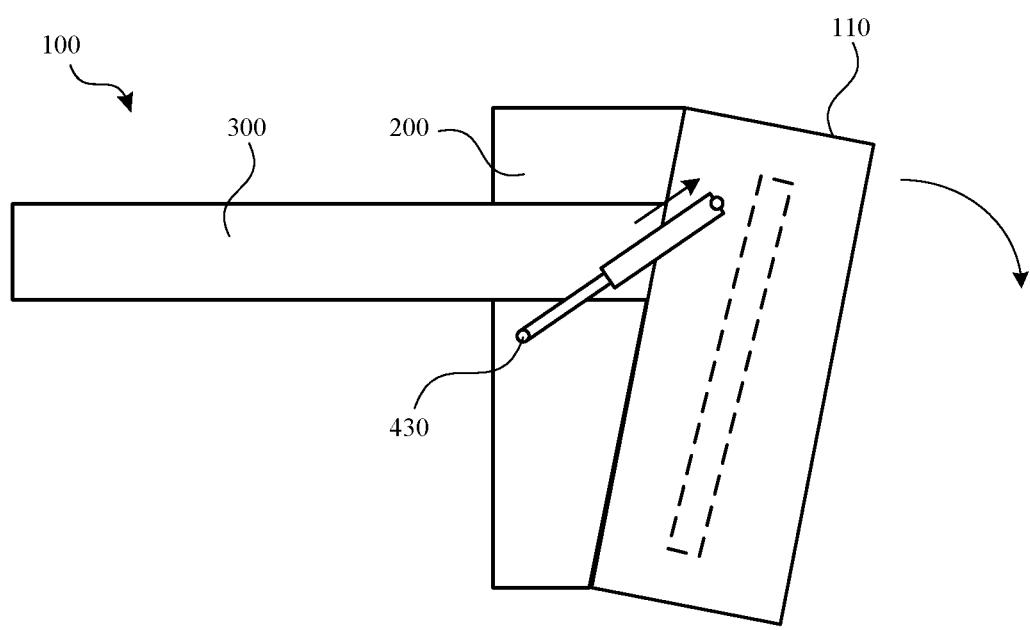
FIG. 11 illustrates a side view of the head-mountable device of FIG. 10 in a second configuration, according to some embodiments of the present disclosure.

As shown in FIG. 10, the HMD module 110 can be in a first orientation with respect to the light seal module 200, in which the HMD module 110 is tilted to achieve a first angle. Such a configuration can place the display element 140 at a desired distance away from the eyes of the user. Such a configuration can place the display element 140 at a desired orientation with respect to the eyes of the user.

As shown in FIG. 5, a tilt element 430 can be operated to move the HMD module 110 to a second orientation with respect to the light seal module 200, in which the HMD module 110 is tilted to achieve a second angle, different than the first angle.

The tilt element 430 can be actively operated based on control signals generated by a component of the head-mountable device 100 and/or in response to detected conditions. The tilt element 430 can include one or more sliding members, wheels, rotors, gears, linear actuators, pistons, rack and pinion systems, hydraulic systems, electroactive polymers, piezoelectric elements, and the like. Where applicable, the HMD module 110 can be configured to pivot with respect to the light seal module 200, such that linear motion at one location is translated to rotation of the HMD module 110 with respect to the light seal module 200. Such mechanisms can be controllably operated by a motor, controller, processor, or other component onboard the head-mountable device 100.

Figure 12:
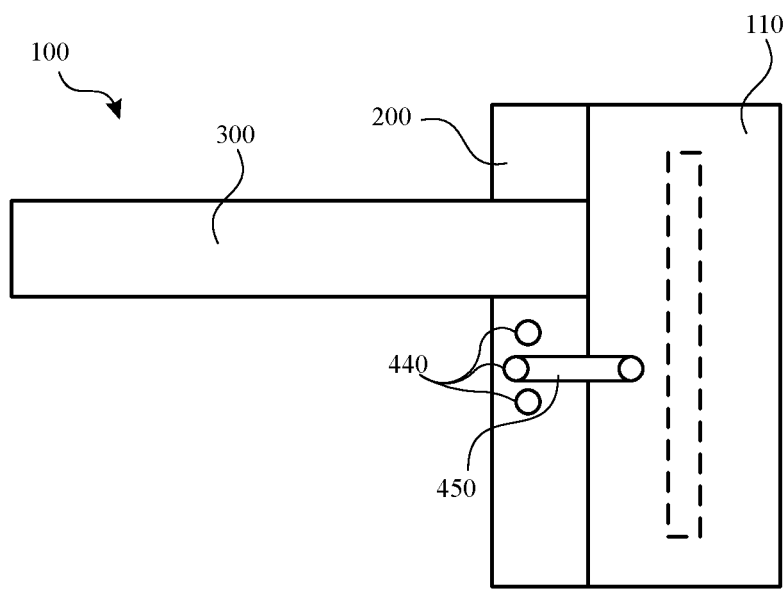
FIG. 12 illustrates a side view of a head-mountable device in a first configuration, according to some embodiments of the present disclosure.

While the adjustment described herein can be automated, additionally or alternatively a user can manually adjust a degree of tilt. As shown in FIG. 12, the HMD module 110 can be manually placed in a first orientation with respect to the light seal module 200, in which the HMD module 110 is tilted to achieve a first angle.

Figure 13:
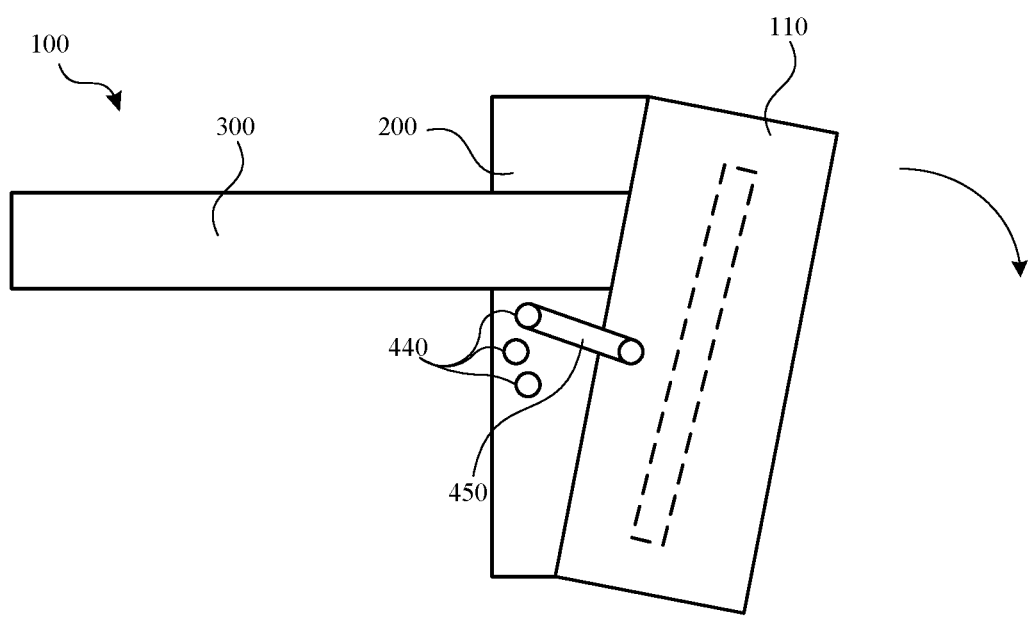
FIG. 13 illustrates a side view of the head-mountable device of FIG. 12 in a second configuration, according to some embodiments of the present disclosure.

As shown in FIG. 7, a rotation element 440 can facilitate manual adjustment to rotate the HMD module 110 to a second orientation with respect to the light seal module 200, in which the HMD module 110 is tilted to achieve a second angle, different than the first angle. The adjustment element 420 can be manually operated when grasped or otherwise acted upon by a user. The adjustment element 420 can include one or more rotation element, hinged devices, sliding members, pistons, rollers, wheels, rotors, tracks, and the like. Where applicable, the HMD module 110 can be configured to pivot with respect to the light seal module 200, such that linear motion at one location is translated to rotation of the HMD module 110 with respect to the light seal module 200. Such mechanisms can be controllably operated by a user, and termination of such operation can allow the HMD module 110 to remain in place. For example, as shown in FIGS. 12 and 13, a detent, brake, friction member, and the like can maintain the HMD module 110 in an orientation achieved by the user.

Figure 14:
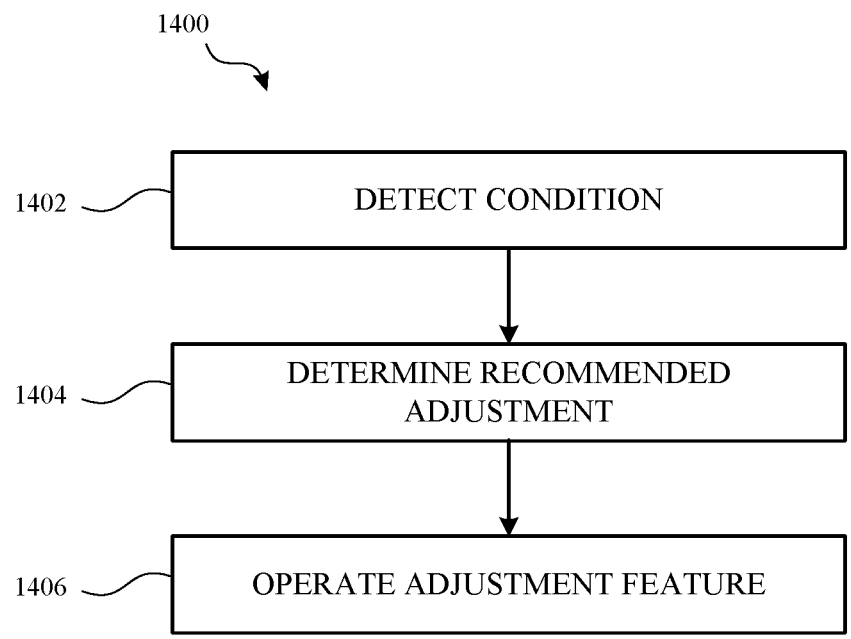
FIG. 14 illustrates a flow chart for a process having operations performed by a head-mountable device, according to some embodiments of the present disclosure.

FIG. 14 illustrates a flow diagram of an example process 1400 for determining a recommended light seal module with corresponding output to a user. For explanatory purposes, the process 1400 is primarily described herein with reference to the head-mountable device 100 of FIGS. 1-13. However, the process 1400 is not limited to the head-mountable device 100 of FIGS. 1-13, and one or more blocks (or operations) of the process 1400 may be performed by different components of the head-mountable device and/or one or more other devices. Further for explanatory purposes, the blocks of the process 1400 are described herein as occurring in serial, or linearly. However, multiple blocks of the process 1400 may occur in parallel. In addition, the blocks of the process 1400 need not be performed in the order shown and/or one or more blocks of the process 1400 need not be performed and/or can be replaced by other operations.

The process 1400 can begin when the head-mountable device detects a condition (1402).

In some embodiments, the condition can be an identity of the user wearing the head-mountable device. The identity can be detected with one or more sensors and/or input devices of the head-mountable device, as described herein. Additionally or alternatively, the identity can be detected with one or more sensors and/or input devices of an external device in communication with the head-mountable device, as described herein. The identity and/or an indication thereof can be used to retrieve information relating to the user (e.g., in a user profile), where such information can be used to determine a recommended adjustment to a light seal module, an HMD module, and/or a head securement element (e.g., tensioner).

In some embodiments, the condition can be an interaction between the head-mountable device and the user. For example, one or more sensors of the head-mountable device can detect one or more forces applied to the face of the user (e.g., by the light seal element and/or the head-securement element), as described herein. The detected forces or other can be used to determine a recommended adjustment to a light seal module, an HMD module, and/or a head securement element (e.g., tensioner).

In some embodiments, the condition can be an operational state of the head-mountable device (e.g., on/off state, application launch, user input command, and the like). For example, the determination of a recommended adjustment can be based, at least in part, on an activity (e.g., operational mode) of the head-mountable device and/or the user. For example, the head-mountable device can recognize and/or provide an indication that an active operation, program, application, and/or activity involves a magnitude and/or type of movement by the user. By further example, the indication can relate to an output (e.g., on the display element) prompting the user to move (e.g., during an exercise activity). A particular adjustment may be recommended to maintain engagement with the face of the user during such an operational mode. In another operational mode, the head-mountable device can recognize and/or provide an indication that an active operation, program, application, and/or activity does not involve a magnitude and/or type of movement by the user. For example, the head-mountable device can output video and/or audio for the user to passively observe without active movement. A particular adjustment may be recommended to reduce forces applied to the face of the user during such an operational mode. Additionally or alternatively, the head-mountable device can detect an activity such as movement of the head-mountable device corresponding to movement by the user. Such movement exceeding a given threshold of magnitude and/or exceeding a threshold of time can be addressed by tightening the band, for example based on an anticipated continuation of such movement. Such a response can be maintained until the activity (e.g., magnitude and/or duration of movement) decreases or ceases. Accordingly, the head-mountable device and/or other device can determine the recommended adjustment for a duration of time (e.g., throughout the duration of an operational mode).

Based on the condition, the head-mountable device can determine a recommended adjustment to a light seal module, an HMD module, and/or a head securement element (e.g., tensioner) (1404). The adjustment can be one that accommodates the user's face based on a detected condition. An adjustment can be to the HMD module, the light seal module, the head securement element, and/or another component of the head-mountable device. For example, the recommended adjustment can include altering the position of the HMD module with respect to the light seal module and/or the user (e.g., to position the display elements with respect to the eyes of the user). By further example, the recommended adjustment can include altering the orientation of the HMD module with respect to the light seal module and/or the user (e.g., to orient the display elements with respect to the eyes of the user). By further example, the recommended adjustment can include tightening or loosening the tensioner of the head securement element, which can alter the engagement of the light seal module on the face of the user.

Based on the recommended adjustment, the head-mountable device can operate one or more components thereof to adjust a light seal module, an HMD module, and/or a head securement element (1406). For example, the head-mountable device can operate and/or adjust the light seal module, the tensioner, the actuation element, the adjustment element, the tilt element, and/or the rotation element. It will be understood that one or more of these components can be operated in parallel or series to achieve the desired adjustment. Such operations can control the position, orientation, and/or tightness of one or more components of the head-mountable device.

Figure 15:
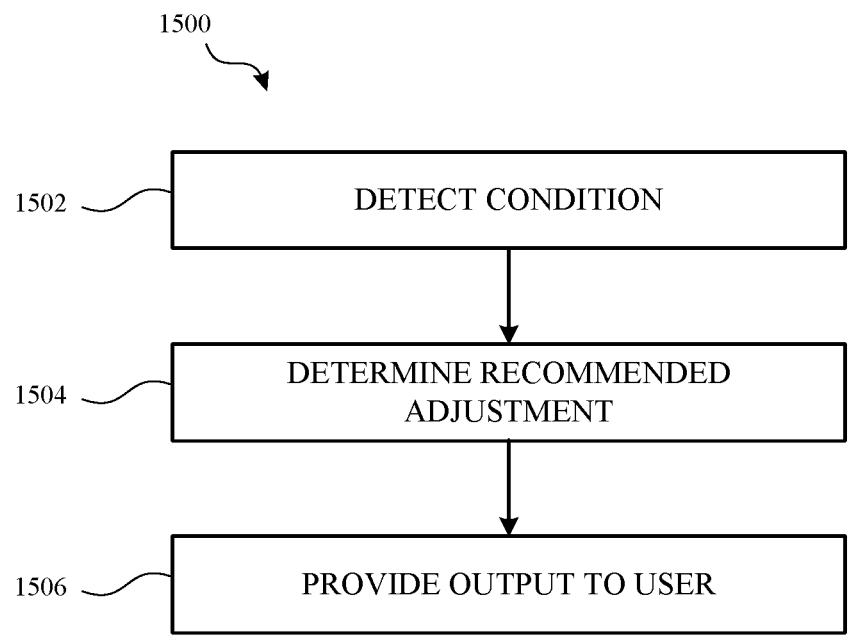
FIG. 15 illustrates a flow chart for a process having operations performed by a head-mountable device, according to some embodiments of the present disclosure.

FIG. 15 illustrates a flow diagram of an example process 1500 for determining a recommended light seal module with corresponding output to a user. For explanatory purposes, the process 1500 is primarily described herein with reference to the head-mountable device 100 of FIGS. 1-13. However, the process 1500 is not limited to the head-mountable device 100 of FIGS. 1-13, and one or more blocks (or operations) of the process 1500 may be performed by different components of the head-mountable device and/or one or more other devices. Further for explanatory purposes, the blocks of the process 1500 are described herein as occurring in serial, or linearly. However, multiple blocks of the process 1500 may occur in parallel. In addition, the blocks of the process 1500 need not be performed in the order shown and/or one or more blocks of the process 1500 need not be performed and/or can be replaced by other operations.

The process 1400 can begin when the head-mountable device detects a condition (1502). In some embodiments, the condition can be an identity of the user wearing the head-mountable device, an interaction between the head-mountable device and the user, and/or an operational state of the head-mountable device, as described with respect to operation 1402.

Based on the condition, the head-mountable device can determine a recommended adjustment to a light seal module, an HMD module, and/or a head securement element (e.g., tensioner) (1504). The adjustment can be to the HMD module, the light seal module, the head securement element, and/or another component of the head-mountable device, as described with respect to operation 1404.

Based on the recommended adjustment, the head-mountable device or other device can provide an output to a user based on the recommended light seal module and/or recommended adjustment (1506). For example, the head-mountable device can provide a visual output on the display elements, a sound, or other output that communicates to the user an indication of the recommended light seal module and/or recommended adjustment. The user can then take appropriate actions to adjust the HMD module, the light seal module, the head securement element, and/or another component of the head-mountable device. In some examples, the head-mountable device can communicate with another system to order a recommended adjustment. The output can further include instructions for adjusting the HMD module, the light seal module, the head securement element, and/or another component of the head-mountable device and/or otherwise achieving the recommended adjustment.

Figure 16:
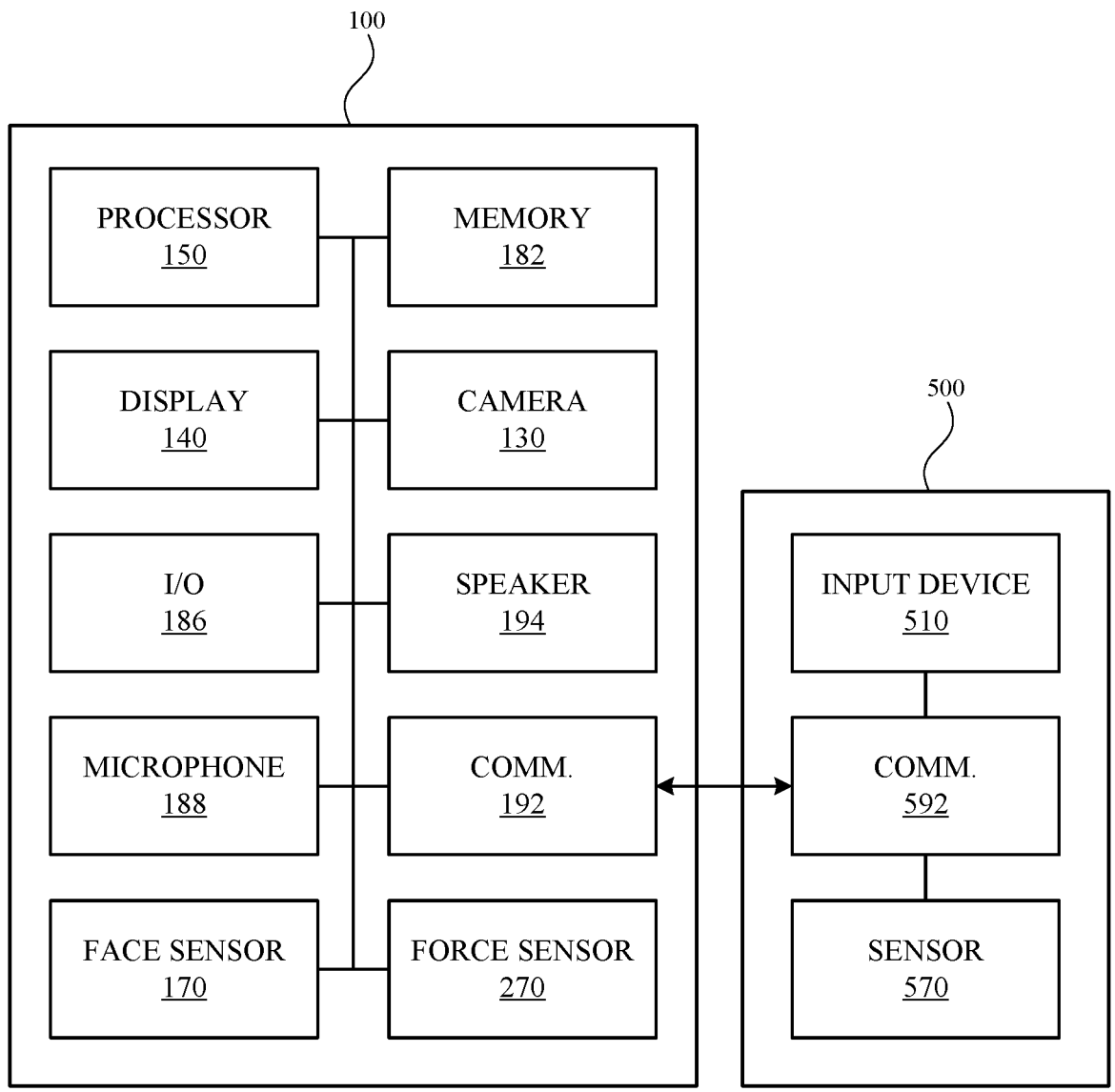
FIG. 16 illustrates a block diagram of a head-mountable device, in accordance with some embodiments of the present disclosure.

Referring now to FIG. 16, components of the head-mountable device can be operably connected to provide the performance described herein. FIG. 16 shows a simplified block diagram of an illustrative head-mountable device 100 in accordance with one embodiment of the invention. It will be appreciated that components described herein can be provided on one, some, or all of an HMD module, a light seal module, and/or a securement element. It will be understood that additional components, different components, or fewer components than those illustrated may be utilized within the scope of the subject disclosure.

As shown in FIG. 16, the head-mountable device 100 can include a processor 150 (e.g., control circuitry) with one or more processing units that include or are configured to access a memory 182 having instructions stored thereon. The instructions or computer programs may be configured to perform one or more of the operations or functions described with respect to the head-mountable device 100. The processor 150 can be implemented as any electronic device capable of processing, receiving, or transmitting data or instructions. For example, the processor 150 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 182 can store electronic data that can be used by the head-mountable device 100. For example, the memory 182 can store electrical data or content such as, for example, audio and video files, documents and applications, device settings and user preferences, timing and control signals or data for the various modules, data structures or databases, and so on. The memory 182 can be configured as any type of memory. By way of example only, the memory 182 can be implemented as random access memory, read-only memory, Flash memory, removable memory, or other types of storage elements, or combinations of such devices.

The head-mountable device 100 can further include a display element 140 for displaying visual information for a user. The display element 140 can provide visual (e.g., image or video) output. The display element 140 can be or include an opaque, transparent, and/or translucent display. The display element 140 may have a transparent or translucent medium through which light representative of images is directed to a user's eyes. The display element 140 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mountable device 100 can include an optical subassembly configured to help optically adjust and correctly project the image-based content being displayed by the display element 140 for close up viewing. The optical subassembly can include one or more lenses, mirrors, or other optical devices.

The head-mountable device 100 can further include a camera 130 for capturing a view of an external environment, as described herein. The view captured by the camera can be presented by the display element 140 or otherwise analyzed to provide a basis for an output on the display element 140.

The head-mountable device 100 can include an input/output component 186, which can include any suitable component for connecting head-mountable device 100 to other devices. Suitable components can include, for example, audio/video jacks, data connectors, or any additional or alternative input/output components. The input/output component 186 can include buttons, keys, or another feature that can act as a keyboard for operation by the user.

The head-mountable device 100 can include the microphone 188 as described herein. The microphone 188 can be operably connected to the processor 150 for detection of sound levels and communication of detections for further processing, as described further herein.

The head-mountable device 100 can include the speakers 190 as described herein. The speakers 190 can be operably connected to the processor 150 for control of speaker output, including sound levels, as described further herein.

The head-mountable device 100 can include communications circuitry 192 for communicating with one or more servers or other devices using any suitable communications protocol. For example, communications circuitry 192 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 192 can also include an antenna for transmitting and receiving electromagnetic signals.

The head-mountable device 100 can include one or more user sensors 170 that are operable to measure features of the face of a user, as described herein.

The head-mountable device 100 can include one or more force sensors 270 for detecting forces applied to regions of the face of the user, as described herein.

The head-mountable device 100 can include one or more head securement sensor 370 for detecting tension in or another condition of the head securement element 300, as described herein.

The head-mountable device 100 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc. Sensors can include the camera 130 which can capture image based content of the outside world.

The head-mountable device 100 can include a battery, which can charge and/or power components of the head-mountable device 100. The battery can also charge and/or power components connected to the head-mountable device 100.

The head-mountable device 100 can include adjustment control components described herein, such as a motor, an actuator, and the like for moving components to a desired relative position and/or orientation.

An external device 500 can be provided in communication with the head-mountable device. The external device can include a portable computing device, a tablet device, a laptop computer, a smartphone, a smart watch, or other appropriate devices that include one or more sensors and/or input devices. The external device 500 can include a sensor 570 and/or an input device 510. The external device 500 can provide and/or record an identity of the user wearing the head-mountable device. For example, when a user holding or wearing the external device is also wearing the head-mountable device, the head-mountable device can detect the external device and determine the identity of the one holding and/or wearing the external device (e.g., as owner of the external device) as the same person wearing the head-mountable device. The external device can identify the user based on one or more of a variety of detections and/or inputs, such as a fingerprint scan and/or other biometric scan by the sensor 570 and/or an input provided at the input device 510 to identify the user based on a unique identifier (e.g., selection from menu of users, passcode, password, etc.).

Communication between an external device 500 and the head-mountable device 100 can optionally be conducted via the communications circuitry 192 and 592. The communications circuitry 592 can include one or more features described herein with respect to the communications circuitry 192.

Accordingly, embodiments of the present disclosure provide a head-mountable device can include an ability to adjust a fit as needed for a particular user or activity. For example, a light seal module that provides engagement of a user's face and transmits light from a display element can be coupled to an HMD module. The light seal module can be provided in a wide variety of adjustable sizes and/or shapes to allow any given user to select an appropriate one for optimal alignment of an HMD module. The head-mountable device and/or other electronic devices can be operated to guide a user to select the optimal light seal module arrangement for use with an HMD module. For example, the head-mountable device or another device can include sensors for detecting an identity of a user, features of the user's face, forces distributed on the face when worn, and/or an activity being performed.

Various examples of aspects of the disclosure are described below as clauses for convenience. These are provided as examples, and do not limit the subject technology.

Clause A: a head-mountable device comprising: an HMD module comprising a display element; a light seal module coupled to the HMD module and configured to rest on a face of a user; an eye sensor configured to detect at least one of a position or an orientation of an eye of the user with respect to the display element of the HMD module; wherein the light seal module is configured to transition, based on the at least one of the position or the orientation of the eye with respect to the display element, between: a first configuration in which the display element is in at least one of a first position or first orientation with respect to the eye of the user; and a second configuration in which the display element is in at least one of a second position or second orientation with respect to the eye of the user.

Clause B: a head-mountable device comprising: an HMD module comprising a display element; a head securement element extending from the HMD module and configured to engage a head of a user; a tensioner coupled to the head securement element; and a processor configured to: detect an activity of the HMD module; and based on a detection of the activity, operate the tensioner to adjust a tightness of the head securement element.

Clause C: a head-mountable device comprising: an HMD module comprising a display element; a light seal module coupled to the HMD module and configured to rest on a face of a user; a processor configured to: receive an indicator corresponding to an identity of the user wearing the head-mountable device; based on the indicator, adjust at least one of a position or an orientation of the HMD module with respect to the light seal module.

One or more of the above clauses can include one or more of the features described below. It is noted that any of the following clauses may be combined in any combination with each other, and placed into a respective independent clause, e.g., clause A, B, or C.

Clause 1: a head securement element extending from the HMD module and configured to engage a head of the user; a microphone; a speaker; and communications circuitry for communicating with another device.

Clause 2: in the first configuration, an inner side of the light seal module and an inner side of the HMD module are separated by a first distance; and in the second configuration, the inner side of the light seal module and the inner side of the HMD module are separated by a second distance, greater than the first distance.

Clause 3: in the first configuration, the light seal module forms a first angle with respect to the HMD module; and in the second configuration, the light seal module forms a second angle, greater than the first angle, with respect to the HMD module.

Clause 4: the light seal module comprises a light seal module attachment element releasably engaged with an HMD module attachment element of the HMD module.

Clause 5: in the light seal module comprises: a chassis defining an opening; and a cover extending about the chassis.

Clause 6: a processor configured to: based on the at least one of the position or the orientation of the eye with respect to the display element, determine a recommended adjustment to the light seal module; and provide an output to the user, the output comprising an indication of the recommended adjustment.

Clause 7: a processor configured to determine the recommended adjustment based on an operational mode of the HMD module.

Clause 8: the light seal module forms an inner side and an outer side, wherein the inner side and the outer side are adjustable to control an orientation of the display element with respect to the eye of the user.

Clause 9: the activity is a first activity; the tightness is a first tightness; the processor is further configured to: detect a second activity of the HMD module; and based on a detection of the second activity, operate the tensioner to adjust to a second tightness of the head securement element, the second tightness being greater than the first tightness.

Clause 10: the activity comprises an output by the display element prompting the user to move the head of the user.

Clause 11: the processor is further configured to: based on the detection of the activity, determine a recommended adjustment to the tensioner; and provide an output to the user, the output comprising an indication of the recommended adjustment.

Clause 12: a communication element, wherein the indicator is received via the communication element and from an external device.

Clause 13: an eye sensor configured to detect a characteristic of an eye of the user and generate the indicator based on the characteristic.

Clause 14: an input device configured to receive an input from the user and determine the indicator based on the input.

Clause 15: the processor is further configured to: based on the indicator, determine a recommended adjustment to the at least one of a position or an orientation of the HMD module with respect to the light seal module; and provide an output to the user, the output comprising an indication of the recommended adjustment.

Clause 16: the light seal module is configured to transition between: a first configuration, in which an inner side of the light seal module and an inner side of the HMD module are separated by a first distance; and a second configuration, the inner side of the light seal module and the inner side of the HMD module are separated by a second distance, greater than the first distance.

Clause 17: a first configuration, in which the light seal module forms a first angle with respect to the HMD module; and a second configuration, the light seal module forms a second angle, greater than the first angle, with respect to the HMD module.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one" of preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
    an HMD module comprising a display element;
    a light seal module coupled to the HMD module and configured to rest on a face of a user;
    an eye sensor; and
    a processor configured to:
        detect, with the eye sensor, a position and an orientation of an eye of the user with respect to the display element of the HMD module; and
        compare the position and the orientation of the eye with respect to the display element to a target position and a target orientation of the eye with respect to the display element; and
        operate an actuator to transition the light seal module, based on the position and the orientation of the eye with respect to the display element and the target position and the target orientation, from a first configuration in which the display element is in a first position and a first orientation with respect to the eye of the user to a second configuration in which the display element is in a second position and a second orientation with respect to the eye of the user.

2. The head-mountable device of claim 1, further comprising:
    a head securement element extending from the HMD module and configured to engage a head of the user;
    a microphone;
    a speaker; and
    communications circuitry for communicating with another device.

3. The head-mountable device of claim 1, wherein:
    in the first configuration, an inner side of the light seal module and an inner side of the HMD module are separated by a first distance; and in the second configuration, the inner side of the light seal module and the inner side of the HMD module are separated by a second distance, greater than the first distance.

4. The head-mountable device of claim 1, wherein:
in the first configuration, the light seal module forms a first angle with respect to the HMD module; and
in the second configuration, the light seal module forms a second angle with respect to the HMD module, greater than the first angle, with respect to the HMD module.

5. The head-mountable device of claim 1, wherein the light seal module comprises a light seal module attachment element releasably engaged with an HMD module attachment element of the HMD module.

6. The head-mountable device of claim 1, wherein the light seal module comprises:
a chassis defining an opening; and
a cover extending about the chassis.

7. The head-mountable device of claim 1, wherein the processor is further configured to:
based on the at least one of the position and the orientation of the eye with respect to the display element, determine a recommended adjustment to the light seal module; and
provide an output to the user, the output comprising an indication of the recommended adjustment.

8. The head-mountable device of claim 7, wherein the processor is configured to determine the recommended adjustment based on an operational mode of the HMD module.

9. The head-mountable device of claim 1, wherein the light seal module forms an inner side and an outer side, wherein the inner side and the outer side are adjustable to control an orientation of the display element with respect to the eye of the user.

10. A head-mountable device comprising:
an HMD module comprising a display element and an eye sensor;
a light seal module coupled to the HMD module and configured to rest on a face of a user; and
a processor configured to:
detect, with the eye sensor, a position and an orientation of an eye of the user with respect to the display element of the HMD module;
compare the position and the orientation of the eye with respect to the display element to a target position and a target orientation of the eye with respect to the display element;
determine, based on the position and the orientation of the eye with respect to the display element and the target position and the target orientation, a recommended adjustment to the light seal module to alter the position and the orientation of the eye with respect to the display element; and
operate an actuator to adjust the light seal module based on the recommended adjustment.

11. The head-mountable device of claim 10, wherein the processor is further configured to operate the actuator by changing a distance between an inner side of the light seal module and an inner side of the HMD module.

12. The head-mountable device of claim 10, wherein the light seal module comprises a light seal module attachment element releasably engaged with an HMD module attachment element of the HMD module.

13. The head-mountable device of claim 10, wherein the light seal module comprises:
a chassis defining an opening; and
a cover extending about the chassis.

14. The head-mountable device of claim 10, wherein the processor is further configured to determine the recommended adjustment based on an operational mode of the HMD module.

15. A head-mountable device comprising:
an HMD module comprising a display element and an eye sensor;
a light seal module coupled to the HMD module and configured to rest on a face of a user; and
a processor configured to:
detect, with the eye sensor, an orientation of an eye of the user with respect to the display element of the HMD module;
determine, based on the orientation of the eye with respect to the display element, a recommended adjustment to the light seal module to alter the orientation of the eye with respect to the display element; and
operate an actuator to adjust the light seal module based on the recommended adjustment.

16. The head-mountable device of claim 15, wherein the processor is further configured to operate the actuator by changing an angle formed between the light seal module and the HMD module.

17. The head-mountable device of claim 15, wherein the light seal module comprises a light seal module attachment element releasably engaged with an HMD module attachment element of the HMD module.

18. The head-mountable device of claim 15, wherein the light seal module comprises:
a chassis defining an opening; and
a cover extending about the chassis.

19. The head-mountable device of claim 15, wherein the processor is further configured to determine the recommended adjustment based on an operational mode of the HMD module.

20. The head-mountable device of claim 15, wherein the light seal module forms an inner side and an outer side, wherein the inner side and the outer side are adjustable to control an orientation of the display element with respect to the eye of the user.

* * * * *